United States Patent [19]

Hines et al.

[11] 4,085,957

[45] Apr. 25, 1978

[54] BUMPER DEVICE FOR A VEHICLE

[75] Inventors: Charles E. Hines; John L. Stransky, both of Lincoln, Nebr.

[73] Assignee: Outboard Marine Corporation, Waukegan, Ill.

[21] Appl. No.: 669,715

[22] Filed: Mar. 24, 1976

[51] Int. Cl.² ............................................. B60R 19/04
[52] U.S. Cl. ............................ 293/88; 293/99; 180/92; 188/74
[58] Field of Search .................. 293/58, 60, 63, 70, 293/87, 88, 69 R, 84, 99, 100, 101; 180/91, 92; 188/20, 74; 224/42.03 R, 42.03 A, 42.04, 42.07, 42.43, 42.44

[56] References Cited

U.S. PATENT DOCUMENTS

| 1,816,005 | 7/1931 | Colombo | 180/92 |
| 1,843,962 | 2/1932 | Tenhulzen | 224/42.07 |
| 3,588,160 | 6/1971 | Reiner | 293/99 |
| 3,843,180 | 10/1974 | Alexander | 293/99 X |

Primary Examiner—Trygve M. Blix
Assistant Examiner—D. W. Keen
Attorney, Agent, or Firm—Michael, Best & Friedrich

[57] ABSTRACT

Disclosed herein is a device adapted for pivotal connection to a vehicle having a wheel and tire assembly, which device reduces the impact transmitted to the vehicle frame during collision of the device with an object. The vehicle, such as a golf car, also disclosed herein, includes a vehicle frame having a front portion and a rear portion, one of which portions includes a pair of laterally spaced channel members. The device includes a bumper having a pair of laterally spaced bracket members with end portions respectively pivotally connected within the vehicle frame channel members. The device further includes yielding means, such as rubber blocks, positioned within the channel members for retaining the bumper in a first position with respect to the vehicle frame during normal vehicle operation, and for affording displacement of the bumper from the first position into the vehicle wheel and tire assembly in response to a collision of the bumper with an object.

5 Claims, 3 Drawing Figures

BUMPER DEVICE FOR A VEHICLE

BACKGROUND OF THE INVENTION

The invention relates generally to a device adapted for connection to a vehicle for reducing the impact transmitted to the vehicle frame in response to a collision of the device with an object, and more particularly, to a device including a bumper adapted for movable connection to a vehicle, such as a golf car, having one or more wheel and tire assemblies.

SUMMARY OF THE INVENTION

The invention disclosed herein provides a device including a bumper adapted for movable connection to a vehicle for reducing the impact transmitted to the vehicle frame during collision of the bumper with an object.

In accordance with an embodiment of the invention, there is provided a device which comprises a bumper adapted for pivotal connection to a vehicle frame including a wheel and tire assembly, and which also comprises yielding means for retaining the bumper in a first position with respect to the vehicle frame during normal vehicle operation, which yielding means affords pivotal displacement of the bumper from the first position into the wheel and tire assembly in response to a collision of the bumper with an object.

Also in accordance with an embodiment of the invention, there is provided a vehicle having a vehicle frame which includes front and rear portions, which portions respectively include an associated wheel and tire assembly. The vehicle further includes a bumper movably connected to one of the front and rear portions and also includes yielding means for retaining the bumper in a first position with respect to the vehicle frame during normal vehicle operation, which yielding means affords displacement of the bumper from the first position into one of the wheel and tire assemblies.

Also in accordance with an embodiment of the invention, one of the front and rear portions of the vehicle frame includes a pair of laterally spaced channel members respectively having a pair of spaced generally horizontal walls. The bumper includes a pair of laterally spaced bracket members having end portions respectively pivotally connected within the channel members. The yielding means comprises a pair of deformable members or rubber blocks respectively positioned within the channel members for engagement with one of the horizontal walls and one of the pivotally connected end portions, which yielding means affords pivotal displacement of the bumper from the first position into one of the wheel and tire assemblies.

Also in accordance with an embodiment of the invention, the vehicle constitutes a golf car, and the bumper is pivotally connected to the vehicle frame rear portion, which bumper includes means for supporting one or more golf bags.

One of the principal features of the invention is the provision of a device adapted for movable connection to a vehicle having a wheel and tire assembly, which device includes a bumper which can be displaced into the wheel and tire assembly of the vehicle in response to a collision of the bumper with an object, thus reducing the impact transmitted to the vehicle frame during the collision.

Another of the principal features of the invention is the provision of a vehicle, such as a golf car, including a pivotally connected bumper for reducing the impact transmitted to the vehicle frame during bumper collision with an object, which bumper also includes means to support one or more golf bags.

Other features and advantages of the embodiments of the invention will become known by reference to the following drawings, general description and claims.

DRAWINGS

Figure 1:
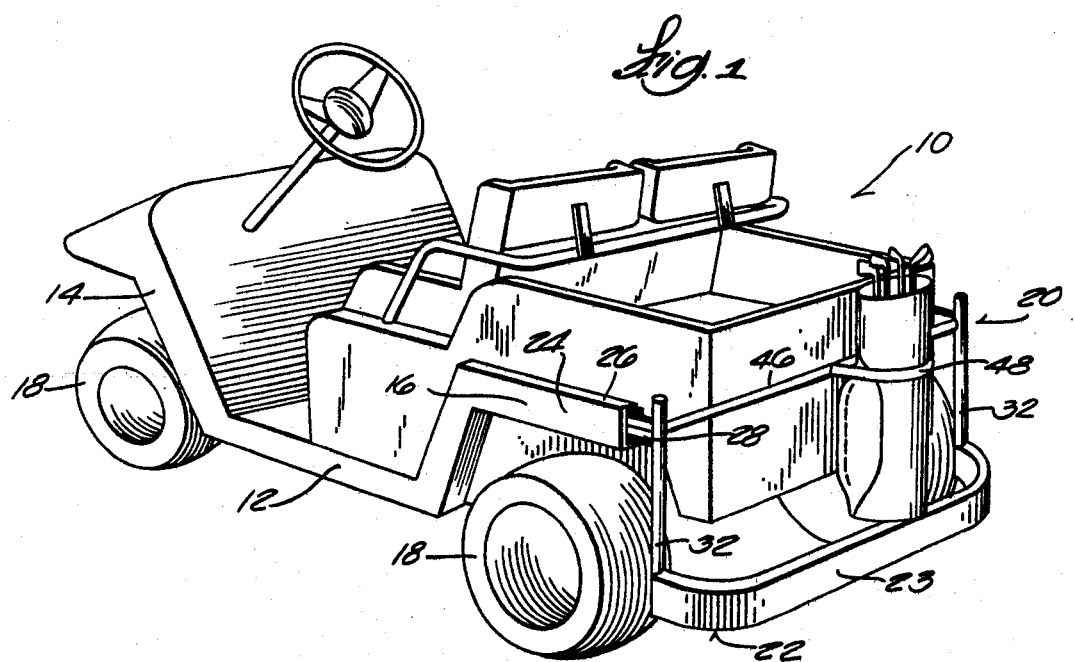
FIG. 1 is a perspective view of a golf car embodying various of the features of the invention.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a vehicle or golf car 10 which includes a vehicle frame 12 having a front portion 14 and a rear portion 16. The front and rear portions respectively include an associated wheel and tire assembly 18.

The golf car 10 also includes a device 20 which comprises a bumper 22 adapted for movable connection to the vehicle frame 12 and which also comprises yielding means for retaining the bumper 22 in a first position with respect to the vehicle frame during normal vehicle operation, which yielding means affords displacement of the bumper 22 from the first position in response to a collision of the bumper 22 with an object. More specifically, as will be explained in more detail below, the bumper 22 is preferably displaced from the first position into one of the wheel and tire assemblies 18, thus reducing the impact of the bumper collision transmitted to the vehicle frame.

The bumper 22 can be movably connected to the golf car 10 in various ways, such as by being connected in slidable engagement with a portion of the vehicle frame 12. The bumper 22 can also be connected to the vehicle frame 12 in any one of several positions, and will reduce the impact transmitted to the vehicle frame 12 during bumper collision, so long as the yielding means affords displacement of the bumper 22 into one of the wheel and tire assemblies 18.

In the preferred embodiment shown, the bumper 22 is adapted for pivotal connection to one of the front and rear portions 14 and 16 of the vehicle frame 12. Preferably, one of the front and rear portions includes a channel member, and the bumper 22 includes a bracket member having an end portion pivotally connected to the channel member.

More specifically, one of the front and rear portions 14 and 16 includes a pair of laterally spaced channel members 24 respectively having a pair of spaced generally horizontal walls 26. The bumper 22 includes a pair of laterally spaced bracket members 28 having end portions 30 respectively pivotally connected within the channel members 24. The bracket members 28 preferably are generally L-shaped members and the end portions 30 include apertures 34 which can be aligned with apertures 36 in the sidewalls of the channel members 24. The end portions 30 (one shown) are respectively pivotally connected to channel members 24 by pivot bolts 38 which respectively extend through the aligned apertures 34 and 36 and spacers 40, which bolts 38 are held in place by securing nuts 42.

While various arrangements are possible, in the preferred embodiment shown, the bumper 22 includes generally vertical members or posts 32. The posts 32 are connected to the bumper bracket members 28 having the end portions 30 respectively pivotally secured within the channel members 24, which channel members 24 preferably are included in the rear portion 16 of the vehicle frame 12. The bumper 22 also includes means for supporting one or more golf bags.

More specifically, the bumper includes a generally horizontal rod 46 extending between the posts 32, one or more straps 48 connected to the horizontal rod 46, and a lower portion 23, which horizontal rod and straps secure one or more golf bags in place while they rest on the lower portion 23 of the bumper. It is to be understood that the bracket members 28 and the posts 32 of the bumper 22 are dimensioned so that the lower portion 23 of the bumper, under impact, can be pivotally displaced into one of the wheel and tire assemblies 18.

The yielding means for retaining bumper 22 in a first position, during normal vehicle operation, and for affording displacement of the bumper 22 in response to a collision of the bumper with an object, comprises a deformable member preferably engaging a vehicle frame channel member and an end portion of a bumper bracket member. More specifically, the yielding means preferably comprises a pair of deformable members respectively positioned within the channel members 24 for engagement with one of the horizontal walls 26 and one of the pivotally connected end portions 30.

Figure 2:
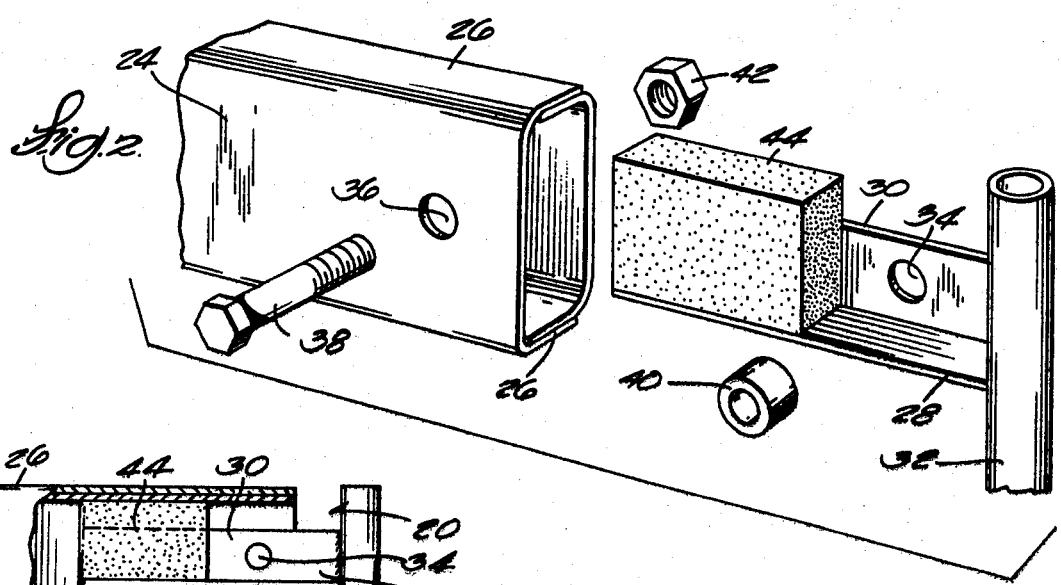
FIG. 2 is an enlarged perspective view of a portion of the golf car shown in FIG. 1.
Figure 3:
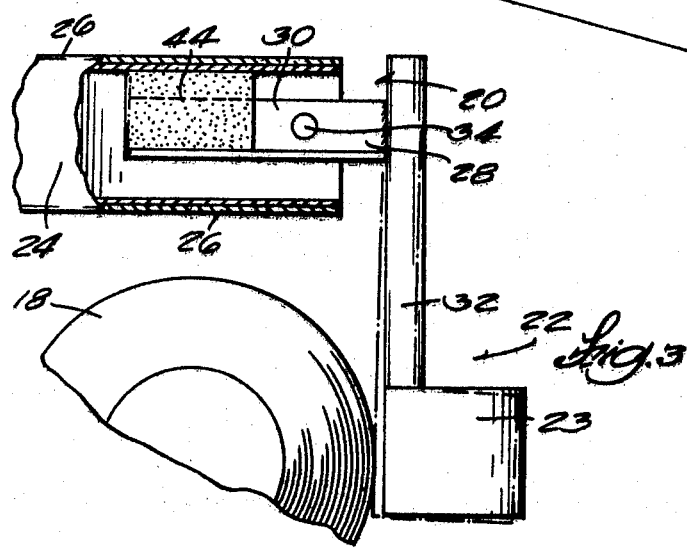
FIG. 3 is an enlarged, partially broken away side plan view of a portion of the golf car shown in FIG. 1, and includes broken lines showing the golf car bumper displaced from a first position shown with solid lines.

Various types of deformable members can be used, including frangible members, or compressible members temporarily or permanently deformed when put under stress. In the preferred embodiment as shown in FIG. 2, each of the deformable members comprises a rubber block 44 (one shown) positioned forwardly of the pivot bolt 38 between the L-shaped bracket member 28 and the upper horizontal wall 26. The rubber blocks 44 are sufficiently stiff so that the bumper 22 is held in a first position during normal vehicle operation.

Since the lower portion 23 of the bumper 22 is positioned below the pivot bolts 38, when the bumper 22 collides with an object, it will tend to pivot inwardly toward one of the wheel and tire assemblies 18. Under sufficient stress, resulting from a collision of the bumper with an object, the deformable members or rubber blocks 44 are compressed, thereby affording pivotal movement of the bumper 22 into one of the wheel and tire assemblies 18. As the bumper 22 is displaced and contacts the wheel and tire assembly 18, the force of the impact is transferred into compression of the rubber blocks 44 and into compression of the wheel and tire assembly 18, thereby cushioning or reducing the impact transmitted to the vehicle frame 12.

It is to be understood that the invention disclosed herein encompasses industrial or commercial vehicles other than golf cars, and that one or more of the devices 20 can be respectively movably connected to a front portion and/or to a rear portion, and/or to other portions of a vehicle frame for affording displacement of the bumper into a wheel and tire assembly.

Various features of the invention are set forth in the following claims.

What is claimed is:

1. A vehicle comprising a vehicle frame including a pair of laterally spaced channel members respectively having a pair of spaced generally horizontal walls, said frame supporting a wheel and tire assembly, a bumper including a pair of laterally spaced bracket members having end portions, horizontally extending pivot means respectively pivotally connecting said end portions within said channel members, and yielding means for retaining said bumper at a first position with respect to said vehicle frame during normal vehicle operation, said yielding means comprising a pair of rubber blocks respectively positioned within said channel members for engagement with one of said horizontal walls and one of said pivotally connected end portions, said rubber blocks being yieldable to afford displacement of said bumper from said first position into said wheel and tire assembly in response to collision of said bumper with an object.

2. A vehicle comprising a vehicle frame including a wheel and tire assembly, a front portion, and a rear portion, one of said front and rear portions including a pair of laterally spaced channel members respectively having a pair of spaced generally horizontal walls, a bumper including a pair of laterally spaced bracket members having end portions respectively pivotally connected within said channel members, and yielding means for retaining said bumper at a first position with respect to said vehicle frame during normal vehicle operation, said yielding means affording displacement of said bumper from said first position into said wheel and tire assembly in response to collision of said bumper with an object, said yielding means comprising a pair of rubber blocks respectively positioned within said channel members for engagement with one of said horizontal walls and one of said pivotally connected end portions.

3. A vehicle in accordance with claim 2 wherein the vehicle constitutes a golf car, and wherein said bumper includes means for supporting a golf bag.

4. A vehicle comprising a vehicle frame including a pair of laterally spaced vertical members and a pair of laterally spaced horizontal members, a bumper including a pair of laterally spaced bracket members having end portions respectively pivotally connected to said vertical members to afford vertical swinging of said bumper incident to impact thereof, and yielding means for retaining said bumper in a first position with respect to said frame during normal vehicle operation and for yielding in response to swinging of said bumper occurring incident to impact, said yielding means comprising a deformable member positioned between one of said horizontal members and one of said end portions.

5. A vehicle in accordance with claim 4 wherein said frame supports a wheel and tire assembly, wherein said pivotal connections between said vertical members and said bracket members extend horizontally and wherein said deformable member affords displacement of said bumper from said first position into said wheel and tire assembly in response to collision of said bumper with an object.

* * * * *